United States Patent

Husain

(10) Patent No.: US 11,543,954 B2
(45) Date of Patent: Jan. 3, 2023

(54) SCROLL ACTIVITY DETECTION FOR SELECTION AND DISPLAY OF INFORMATION

(71) Applicant: SMASHTECH, LLC, San Diego, CA (US)

(72) Inventor: Anwar Husain, San Diego, CA (US)

(73) Assignee: SMASHTECH, LLC, San Diego, CA (US)

(*) Notice: Subject to any disclaimer, the term of this patent is extended or adjusted under 35 U.S.C. 154(b) by 0 days.

(21) Appl. No.: 16/997,251

(22) Filed: Aug. 19, 2020

(65) Prior Publication Data

US 2021/0055842 A1 Feb. 25, 2021

Related U.S. Application Data

(60) Provisional application No. 62/888,675, filed on Aug. 19, 2019.

(51) Int. Cl.
G06F 3/0485 (2022.01)
G06Q 30/02 (2012.01)
G06F 3/0488 (2022.01)

(52) U.S. Cl.
CPC .......... *G06F 3/0485* (2013.01); *G06F 3/0488* (2013.01); *G06Q 30/0267* (2013.01); *G06Q 30/0272* (2013.01); *G06Q 30/0277* (2013.01)

(58) Field of Classification Search
CPC . G06F 3/0485; G06F 3/0488; G06Q 30/0277; G06Q 30/0267; G06Q 30/0272
See application file for complete search history.

(56) References Cited

U.S. PATENT DOCUMENTS

| 6,603,969 | B1 | 8/2003 | Vuoristo et al. |
| 7,904,062 | B2 | 3/2011 | Ashkenazi et al. |
| 8,386,318 | B2 | 2/2013 | Varadarajan et al. |
| 9,652,782 | B2* | 5/2017 | Sanghavi ........... G06Q 30/0267 |
| 9,870,578 | B2 | 1/2018 | Lucash |
| 9,959,192 | B1 | 5/2018 | Burriesci et al. |
| 10,845,948 | B1* | 11/2020 | Lewis ................. G06F 3/0482 |
| 2004/0209602 | A1 | 10/2004 | Joyce et al. |
| 2004/0254905 | A1 | 12/2004 | Tiku |
| 2004/0266388 | A1 | 12/2004 | Maes |
| 2004/0266408 | A1 | 12/2004 | Maes |
| 2005/0064852 | A1 | 3/2005 | Baldursson |
| 2005/0190280 | A1 | 9/2005 | Haas et al. |
| 2006/0094410 | A1 | 5/2006 | Cortegiano |

(Continued)

Primary Examiner — Justin R. Blaufeld
(74) Attorney, Agent, or Firm — Gary L. Eastman, Esq.; Eastman IP

(57) ABSTRACT

A method for displaying additional relevant content involves detecting a change to the scrolling pattern of a viewer of content and adapting displayed content as a result of the change. When a pause in scrolling is detected, and the content visible on the display during the pause is determined. A determination is made whether additional content related to the displayed content, such as a promotion, is available. If related content is available, it is displayed when the user resumes scrolling or begins scrolling in another direction.

The display of related content may take the form of a promotion on a fixed portion of the display, and may be hidden when the user engages a user interface element for removal of the promotion.

7 Claims, 6 Drawing Sheets

(56) References Cited

U.S. PATENT DOCUMENTS

| | | | | |
|---|---|---|---|---|
| 2013/0191220 A1* | 7/2013 | Dent | .................... | G06F 3/0485 |
| | | | | 705/14.64 |
| 2013/0305170 A1* | 11/2013 | de Souza | ............... | G06Q 30/02 |
| | | | | 715/760 |
| 2014/0101582 A1* | 4/2014 | Bamford | ............... | G06F 3/0489 |
| | | | | 715/765 |
| 2014/0165001 A1* | 6/2014 | Shapiro | .................. | G06F 16/54 |
| | | | | 715/811 |
| 2015/0088667 A1* | 3/2015 | Suzuki | ................. | G06T 3/0006 |
| | | | | 705/14.73 |
| 2016/0202865 A1* | 7/2016 | Dakin | ................ | G06F 3/04883 |
| | | | | 715/784 |
| 2017/0193566 A1* | 7/2017 | Lucash | ............. | G06Q 30/0277 |
| 2018/0035150 A1* | 2/2018 | Lewis | ................ | H04N 21/2393 |
| 2018/0300771 A1* | 10/2018 | Roger | ................ | G06Q 30/0277 |
| 2019/0339834 A1* | 11/2019 | Weiner | ................... | G06F 40/14 |

* cited by examiner

SCROLL ACTIVITY DETECTION FOR SELECTION AND DISPLAY OF INFORMATION

RELATED APPLICATION

This application claims priority to U.S. Provisional Patent Application Ser. No. 62/888,675 for "Scroll Activity Detection for Selection and Display of Information" filed Aug. 19, 2019, and currently, the entirety of which is incorporated herein by reference.

FIELD OF THE INVENTION

The present invention pertains generally to detection of content in connection with user scrolling activity for use in displaying related content. More particularly, the present invention pertains to a method for determining content during changes in user scrolling activity in order to select and display related content. The Present invention is particularly, but not exclusively, useful as a method for determining the timing and content of promotions displayed to a computing device user.

BACKGROUND OF THE INVENTION

The selection and presentation of content of interest to a user is an important problem faced by a wide range of providers of content such as search results, social network timelines, news, videos, advertisements, and others. In many cases, multiple types of content are presented on the same content resource, which may be a website, a mobile application, a computer program, or another communication medium. Moreover, the timing, location, and nature of the display of content may significantly affect a user's response to the content.

Advertising often is the source of funding for other types of content, and so has been one field in which this problem has received much attention. U.S. Pat. No. 7,904,062 relates to the display of an advertisement on a mobile system, specifically disclosing actions taken as a content viewer scrolls through content containing an advertisement. However, the '062 patent is primarily directed to the display, rather than the content, of the advertisement. U.S. Patent Application Publication No. 2004/0209602 teaches the use of a user's location in determining advertisements or other content to be sent to a mobile device.

In addition to location-based content selection, large companies often build profiles of individual consumer behavior by sifting through large amounts of accumulated data using modern "data science" algorithms and techniques. These profiles are used to provide the consumer with highly targeted advertising.

These techniques provide at best a "big-picture" view of consumers in a location or even an individual consumer in the sense that they capture the consumer's trends in interest over a period of time. There remains a need for a way to provide content based on a user's momentary interest captured in real-time.

SUMMARY OF THE INVENTION

Disclosed is a method for detecting a change to the scrolling pattern of a viewer of content and adapting displayed content as a result of the change.

In a preferred embodiment, a pause in scrolling is detected, and the content visible on the display during the pause is determined. It is then determined whether additional content related to the displayed content, such as a promotion or offer, is available. If related content is available, it is displayed when the user pauses for a set amount of time, or in an alternative embodiment, resumes scrolling, or, in an alternative preferred embodiment, begins scrolling in another direction.

In a preferred embodiment, the display of related content takes the form of a promotion on a fixed portion of the display, and in a preferred embodiment may be minimized, or, in an alternative embodiment, hidden, when the user engages a user interface element for removal of the promotion.

The disclosed method is particularly useful for the selection and display of promotions and offers related to content being viewed by the user. However, it may also be used to display links to related content or articles available in an application or website, links to related content on external sites such as Wikipedia, background information on an item referred to in the primary content or dictionary entries for obscure words to facilitate a user's understanding of the content being viewed, and other forms of related content.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
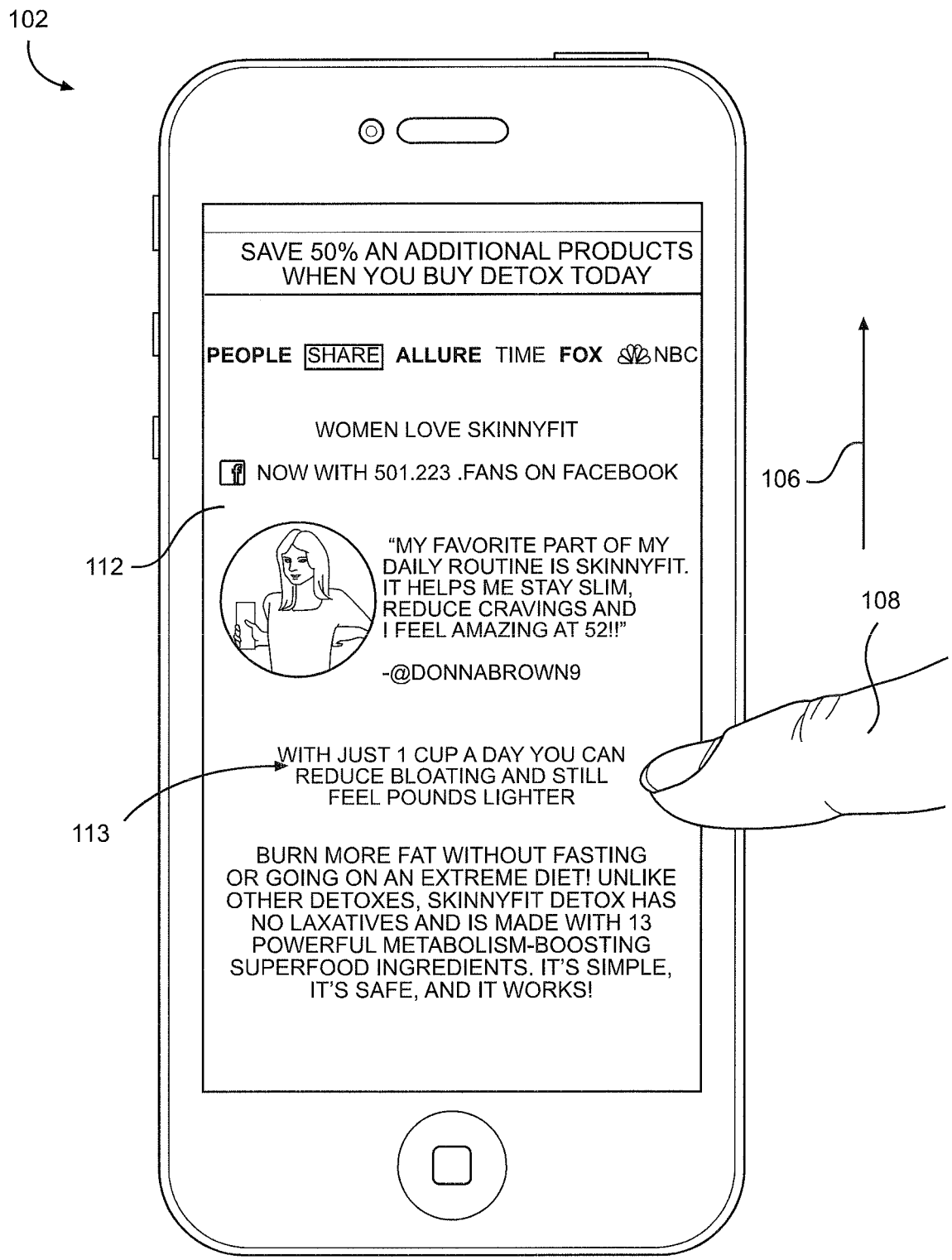
FIG. 1 illustrates a user scrolling through content in an application on an end-user device.

Referring initially to FIG. 1, an end-user device 102 is illustrated displaying primary content 113. A user scrolls through the primary content 113, moving displayed content in direction 106. FIG. 1 depicts the scrolling performed by moving a finger 108 in direction 106 over the screen 112 of end-user device 102. Scrolling may also be performed by a mouse or keyboard, it may be automatically performed until stopped by the user, or other methods of scrolling may be used. Moreover, although end-user device 102 is illustrated as a mobile device, exemplary preferred embodiments of scroll activity detection may be performed on workstations, laptops, smart appliances, and other computing devices, in addition to mobile devices.

Figure 2:
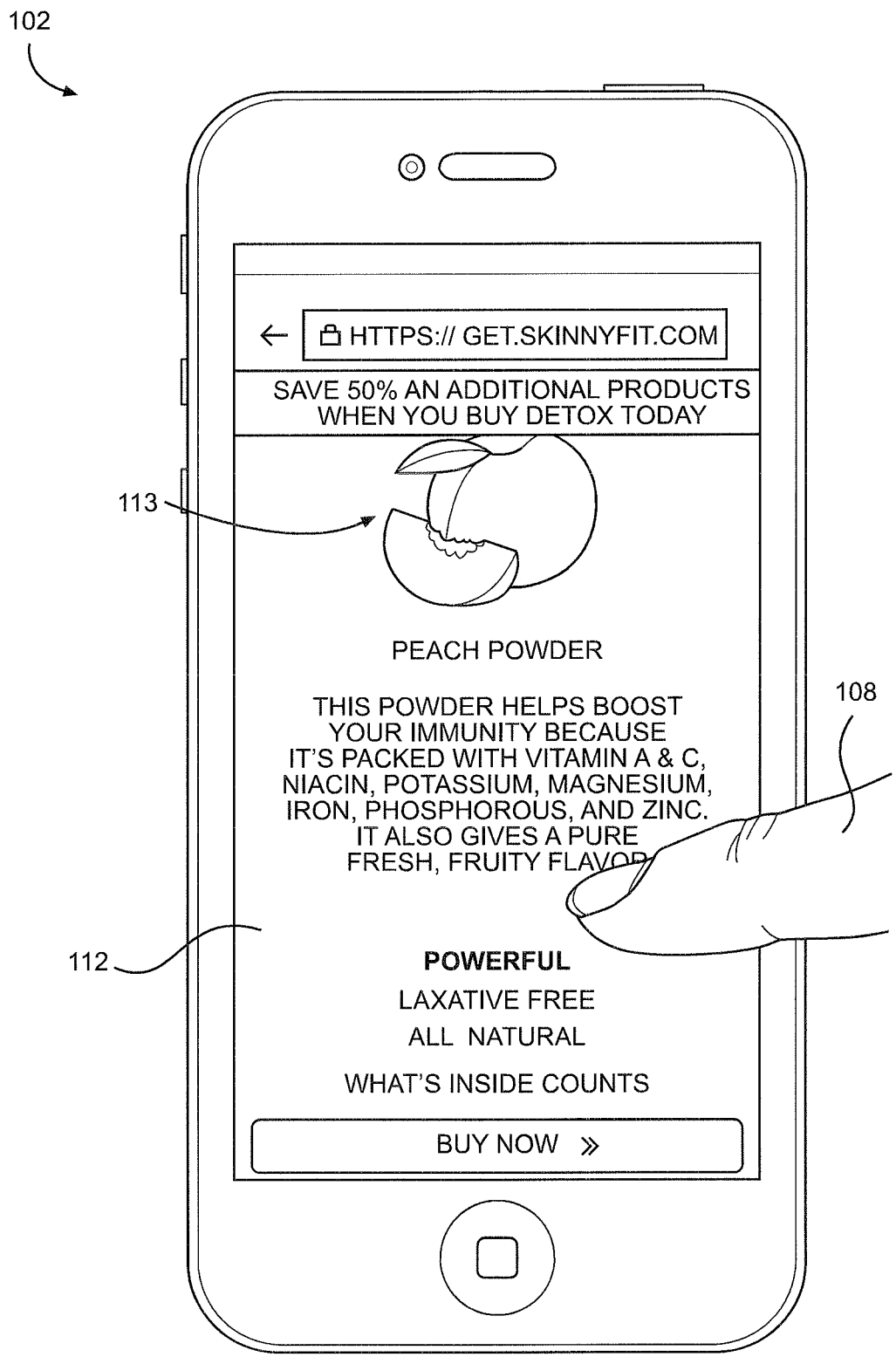
FIG. 2 illustrates a pause in user scrolling activity in an application on an end-user device.

Referring now to FIG. 2, when a user stops scrolling, a query is performed to determine whether there is available content 116 (shown in FIG. 3)—in a preferred embodiment, a promotion—related to the content 113 visible on the screen 112, which is a portion of the primary content.

Figure 3:
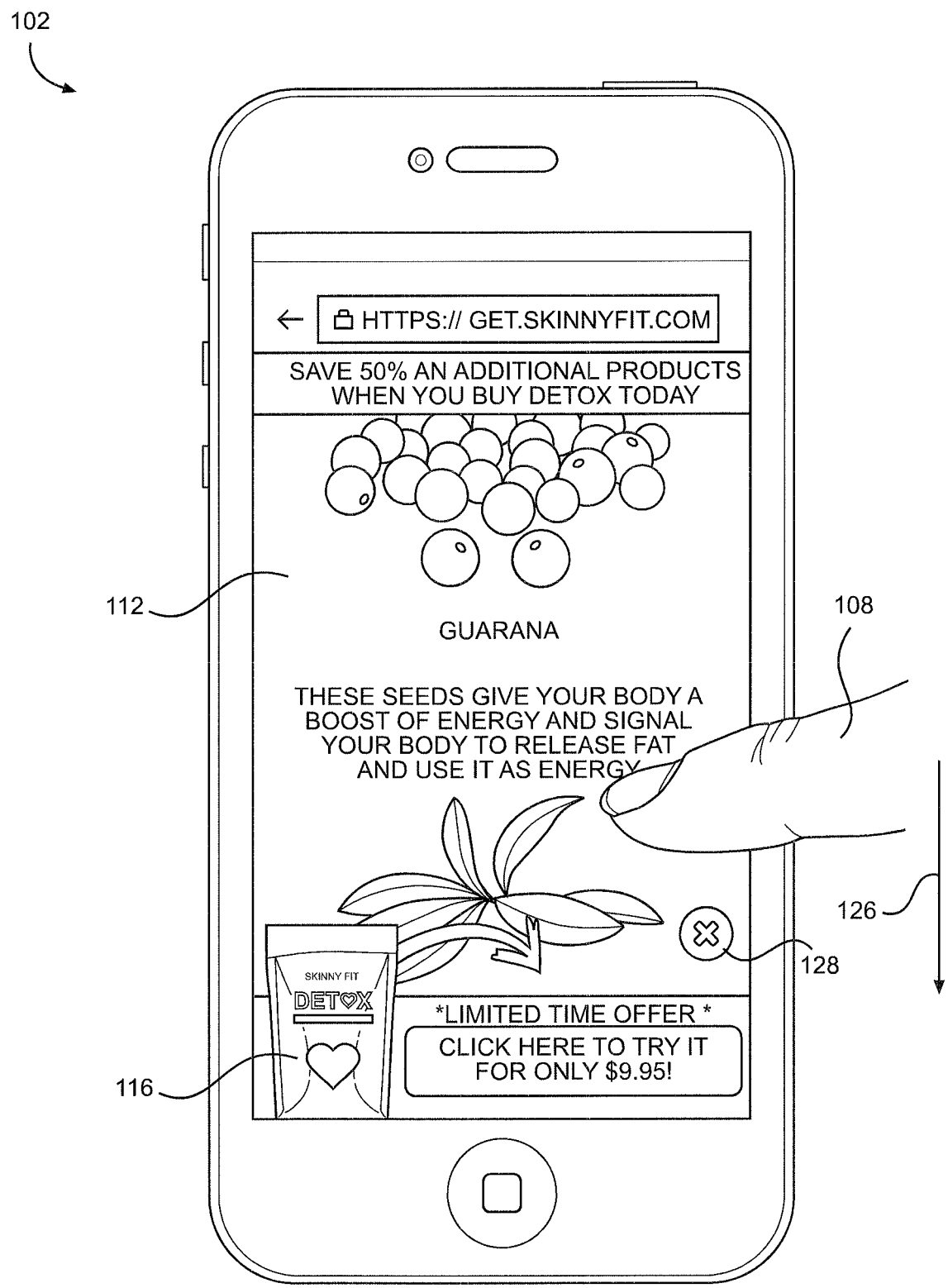
FIG. 3 illustrates a resumption of user scrolling activity in an opposite direction in an application on an end-user device.

As illustrated in FIG. 3, if related content 116 is found, it is displayed when the user begins scrolling again. In certain preferred embodiments, the related content 116 is displayed only when the scrolling resumes in a second direction 126, usually a direction opposite the original direction 106. In other preferred embodiments, a resumption of scrolling, regardless of direction, triggers the display of the related content 116. In exemplary preferred embodiments, the related content 116 is displayed as an overlay over a portion of the screen 112, and is minimizable or, in some embodiments, removable through engagement of a user interface element 128.

Figure 4:
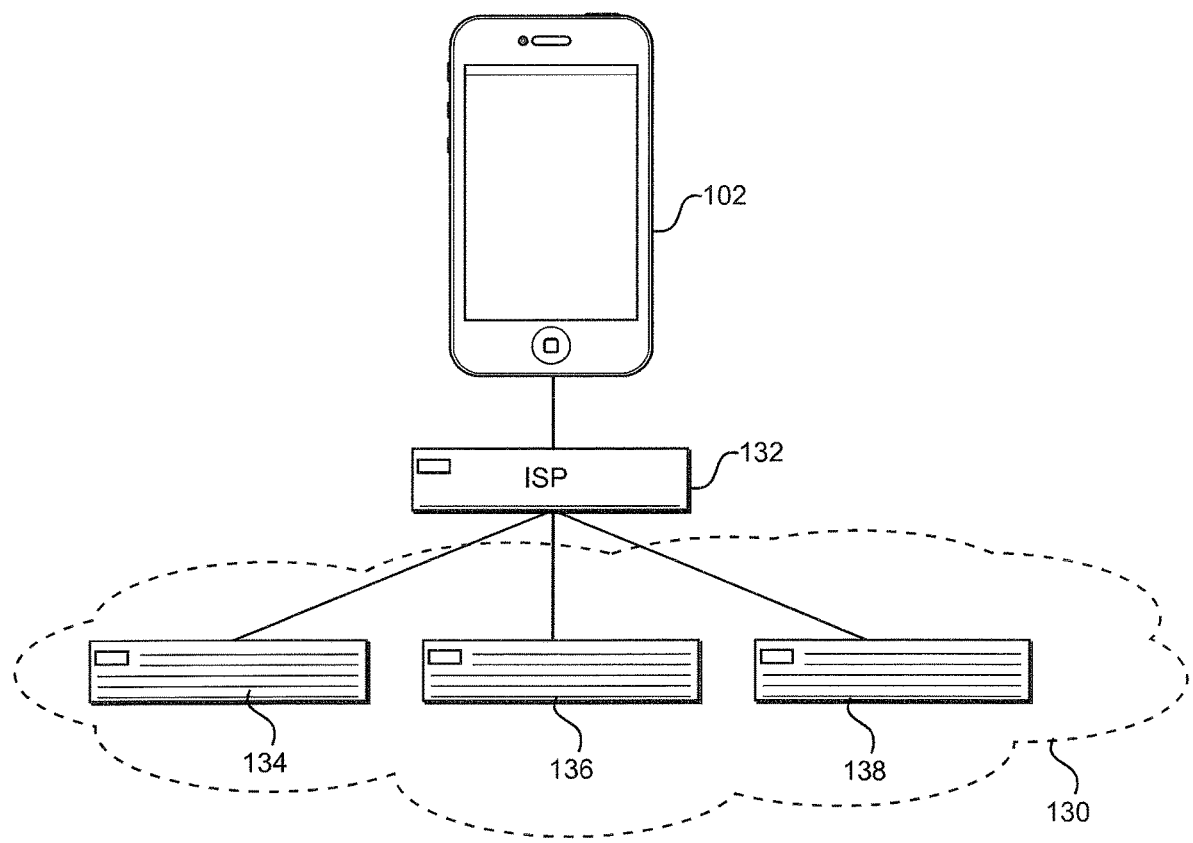
FIG. 4 illustrates components of a preferred embodiment of a system implementing a method for scroll activity detection and retrieval and display of related content.

Referring now to FIG. 4, a diagram of a preferred embodiment of a system implementing scroll activity detection for selection and display of information is illustrated. End-user device 102 will usually be connected to the Internet 130 through an Internet Service Provider ("ISP") 132. The connection to the ISP 132 may be indirect, through a local area network or a wireless network. The connection may also be a direct connection to the ISP 132, or a connection to a mobile network provider which functions as an ISP 132, or through other forms of connections to the Internet 130 known in the art.

End-user device 102 connects to one or more content servers 134 in order to receive primary content 113 to display to the user. Additional content, from which related content 116 is selected, is present on the same content server 134 in some preferred embodiments, but in some alternative preferred embodiments is stored on one or more separate servers 136, hereinafter referred to as promotion server 136 since an exemplary embodiment of related content 116 is an offer or promotion. In exemplary preferred embodiments, one or more data processing servers 138 allows offloading of processing tasks related to content recognition and the selection of related content from end-user device 102.

For illustrative purposes, content server 134, promotion server 136, and data server 138 are illustrated as separate servers. Certain embodiments have one or more of each. However, in some preferred embodiments, the same server will function as data processing server 138 and promotion server 136 or content server 134, or the functionality of all three will be performed by the same server. Thus, in an exemplary preferred embodiment, there is a single server providing primary content, related content, and processing tasks.

Some preferred embodiments allow related content 116 to be selected and displayed while the user browses primary content 113 offline. In order to do so, primary content 113 from content server 134 and additional content from ad server 136 is cached on the end-user device 102. In such cases, end-user device 102 may perform the data processing necessary to select related content 116 to display. Alternatively, some or all of the data processing may be performed in advance by data processor 138, which associates various portions of primary content 113 with portions of the additional content from promotion server 136 to be used as related content 116, and provides a table of the associations to mobile device 102.

In an alternative preferred embodiment, a local area network ("LAN") or other form of network substitutes for Internet 130, and a local network access point, such as a router or wireless access point, substitutes for ISP 132. Content, related-content, and data-processing can thus all be provided on a LAN or other network, such as a local mesh network, rather than through the Internet 130.

Figure 5:
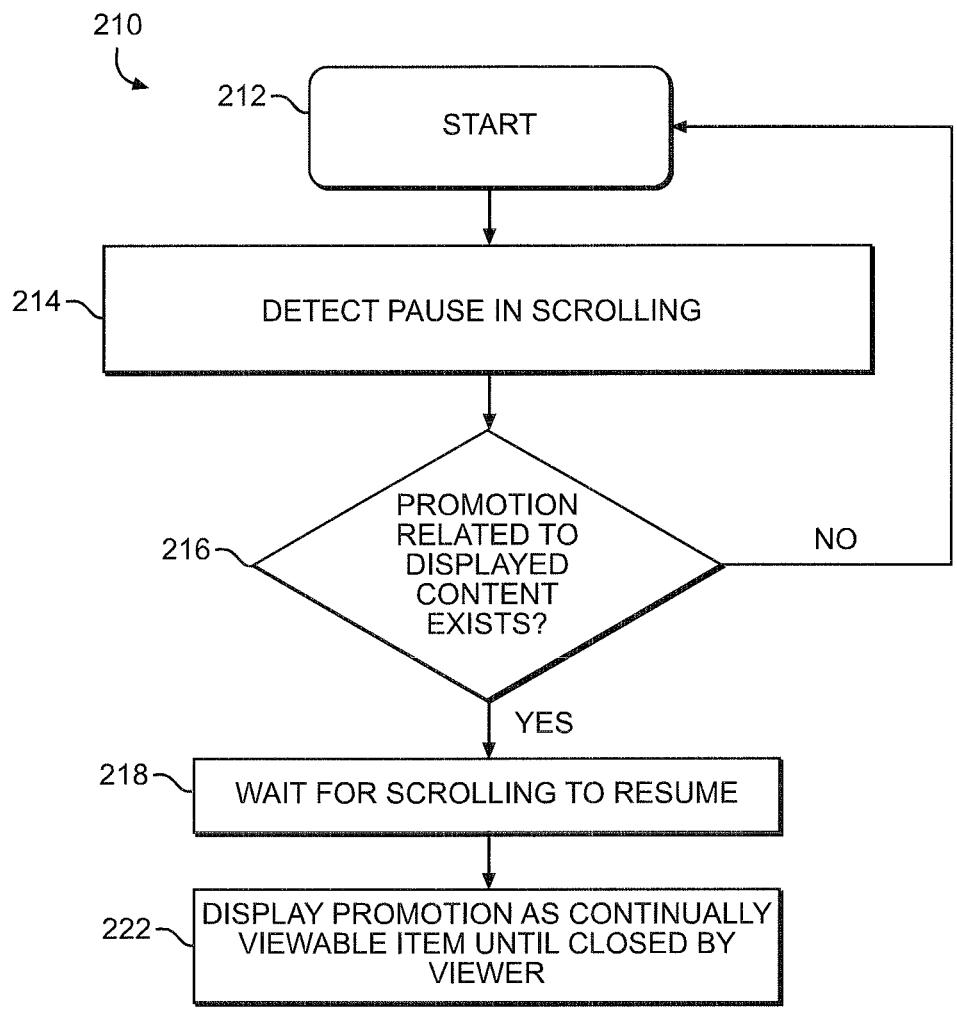
FIG. 5 is a flowchart illustrating a method of selecting and displaying related content based on changes in a user's scrolling behavior.

Referring now to FIG. 5, a process for displaying a promotion or other content after scrolling is resumed by a user is illustrated and generally designated 210. Process 210 includes step 212 in which primary content 113 is displayed to a user, who then scrolls through the content 113. In step 214, a pause in scrolling is detected. Some preferred embodiments require the pause in scrolling to last at least a predetermined duration of time before triggering step 216, in order to avoid triggering step 216 when a user is merely adjusting the position of the user's finger over a screen or scroll wheel in order to continue scrolling.

The detection of a pause in scrolling triggers step 216, in which it is determined whether related content 116 to currently displayed content 113 exists. The identification of displayed content 113 and association with a specific item of related content 116 may have been performed previously, in which case related content 116 is retrieved—either from a local cache or the Internet 130—and prepared for display. Displayed content 113 may also be identified in real-time, through key word identification, image recognition, optical character recognition in combination with key word identification, other identification procedures known in the art, or a combination thereof. In some embodiments, images and text are sent to a data processing server 138 for content identification. A query is performed to determine whether promotion server 136 contains additional content related to the now-identified displayed content 113.

In preferred embodiments, the selection of content is also dependent on the end user, if they have previously viewed content from the content server 134, including their interests, profile information if available, etc., although in preferred embodiments the related content 116 will generally be a promotion or offer for a product currently being viewed.

If no related content 116 is found, then the process returns to step 212 to await the next pause in scrolling. Otherwise, step 218 includes waiting for the user to begin scrolling through content again. Once scrolling resumes, related content 116 is displayed in step 222. In a preferred embodiment, content is displayed as a continually viewable item until it is closed or minimized by the user. One preferred embodiment of step 222 is illustrated in FIG. 3, which shows related content 116 displayed in a fixed location on screen 112 until user interface element 128 is engaged to hide related content 116.

Figure 6:
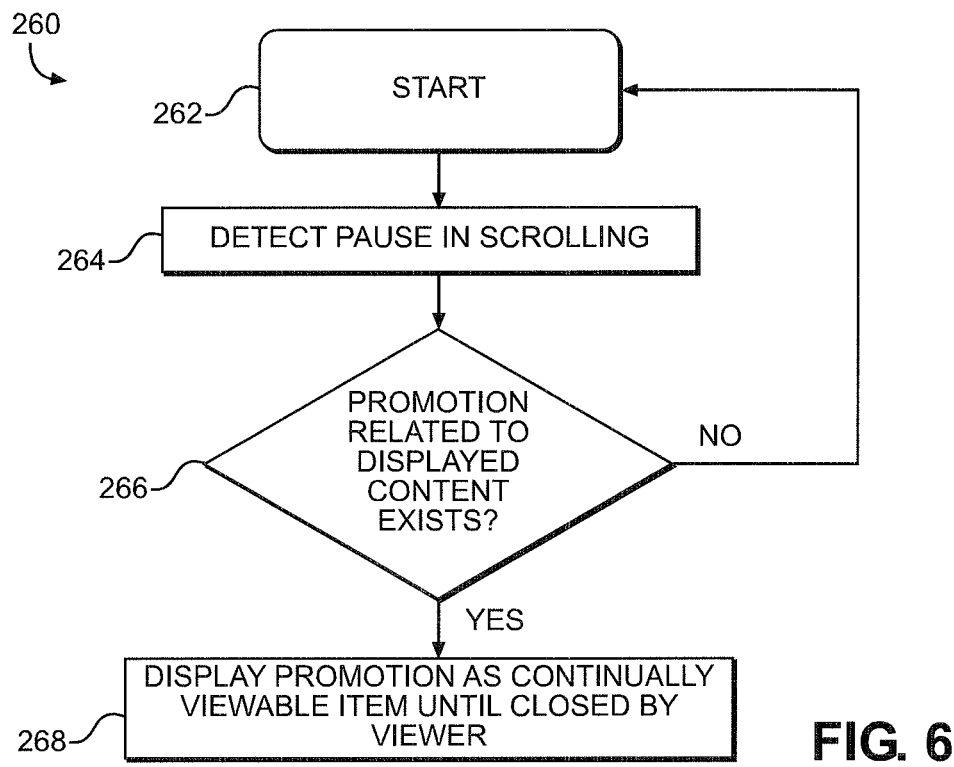
FIG. 6 is a flowchart illustrating a method of selecting and displaying related content when a user pauses scrolling for a predetermined amount of time.

Referring now to FIG. 6, a process for displaying a promotion or other content when a user pauses scrolling for a predetermined amount of time is illustrated and generally designated 260. Process 260 includes step 262 in which primary content 113 is displayed to a user, who then scrolls through the content 113. In step 264, a pause of a predetermined duration in scrolling is detected. During the pause, or in some embodiments, after the pause, step 266 is performed, in which it is determined whether related content 116 to the currently displayed portion of content 113 exists. If no related content 116 is found, the process returns to step 262 to await the next pause in scrolling. After the predetermined duration has passed, related content 116 is displayed in step 268. In a preferred embodiment, content is displayed as a continually viewable item until it is closed or minimized by the user.

Figure 7:
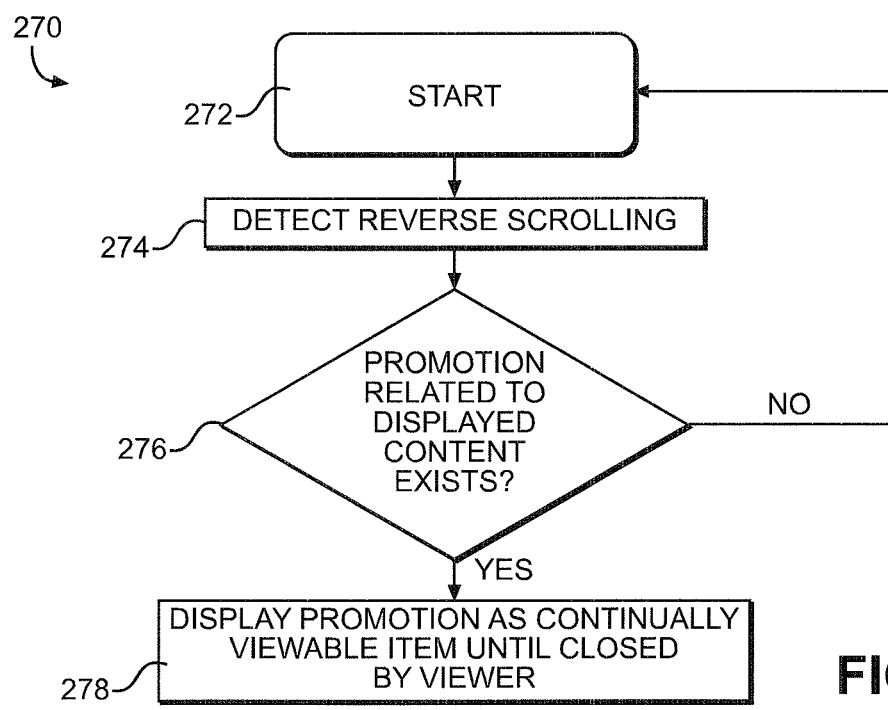
FIG. 7 is a flowchart illustrating a method of selecting and displaying related content based on reversal of scrolling direction.

Referring now to FIG. 7, some embodiments may directly detect a reversal in scrolling direction, ignoring whether scrolling was paused. Therefore, FIG. 7 illustrates more directly a process 270 for displaying a promotion or other content after scrolling is reversed by a user. Process 270 includes step 272 in which primary content 113 is displayed to a user, who then scrolls through the content 113. In step 274, a reversal in scrolling is detected. In step 276 it is determined whether there is related content 116 to the portion of content 113 displayed at the time of the reversal of scrolling. If not, the process returns to step 272 to await the next reversal in scrolling. Otherwise, related content 116 is displayed in step 278. In a preferred embodiment, content is displayed as a continually viewable item until it is closed or minimized by the user.

Referring to FIGS. 5, 6 and 7, in a preferred embodiment the selection and display of related content 116 is performed, or partially performed, with the aid of data processing server 138, through computer instructions provided in an application programming interface ("API"). In alternative preferred embodiments, the selection and display of related content 116 is performed, or partially performed with the aid of data processing server 138, directly by the program or application displaying primary content 113, or through a software library linked to the program or application. Alternatively, in preferred embodiments, JavaScript code, which is included within an application or a website, performs, or partially performs with the aid of data processing server 128, the selection and display of related content 116.

While there have been shown what are presently considered to be preferred embodiments of the present invention, it will be apparent to those skilled in the art that various changes and modifications can be made herein without departing from the scope and spirit of the invention.

What is claimed is:

1. A method for selecting content based on scrolling behavior, comprising the steps of:
    providing an end-user device having a screen, the end-user device operable by a user to scroll through content;
    detecting a pause in scrolling;
    identifying visible content when scrolling is paused;
    determining that no related content associated with the visible content is available;
    waiting for scrolling to resume;
    detecting another pause in scrolling;
    identifying visible content when scrolling is paused;
    determining that related content is available; and
    in response to related content being available, displaying the related content as a continually viewable item until the related content is closed by the user,
    wherein the step of displaying the related content comprises displaying the related content as an overlay over a portion of the screen such that the related content covers a portion of the visible content.

2. The method for selecting content based on scrolling behavior as recited in claim 1, wherein the step of waiting for scrolling to resume further comprises waiting for scrolling to be resumed in a second direction different from a direction in which scrolling occurred immediately prior to the pause in scrolling.

3. The method for selecting content based on scrolling behavior as recited in claim 2, wherein the second direction is opposite the direction in which scrolling occurred immediately prior to the pause in scrolling.

4. The method for selecting content based on scrolling behavior as recited in claim 1, wherein the step of waiting for scrolling to resume further comprises waiting for scrolling to be resumed in a direction in which scrolling occurred immediately prior to the pause in scrolling.

5. The method for selecting content based on scrolling behavior as recited in claim 1, wherein the step of detecting a pause in scrolling consists of detecting a pause lasting at least a predetermined duration of time.

6. The method for selecting content based on scrolling behavior as recited in claim 1, further comprising the step of displaying a user interface element engageable by the user to hide the related content.

7. The method for selecting content based on scrolling behavior as recited in claim 1, wherein the end-user device is a mobile phone or a tablet.

* * * * *